United States Patent Office 3,093,848
Patented June 18, 1963

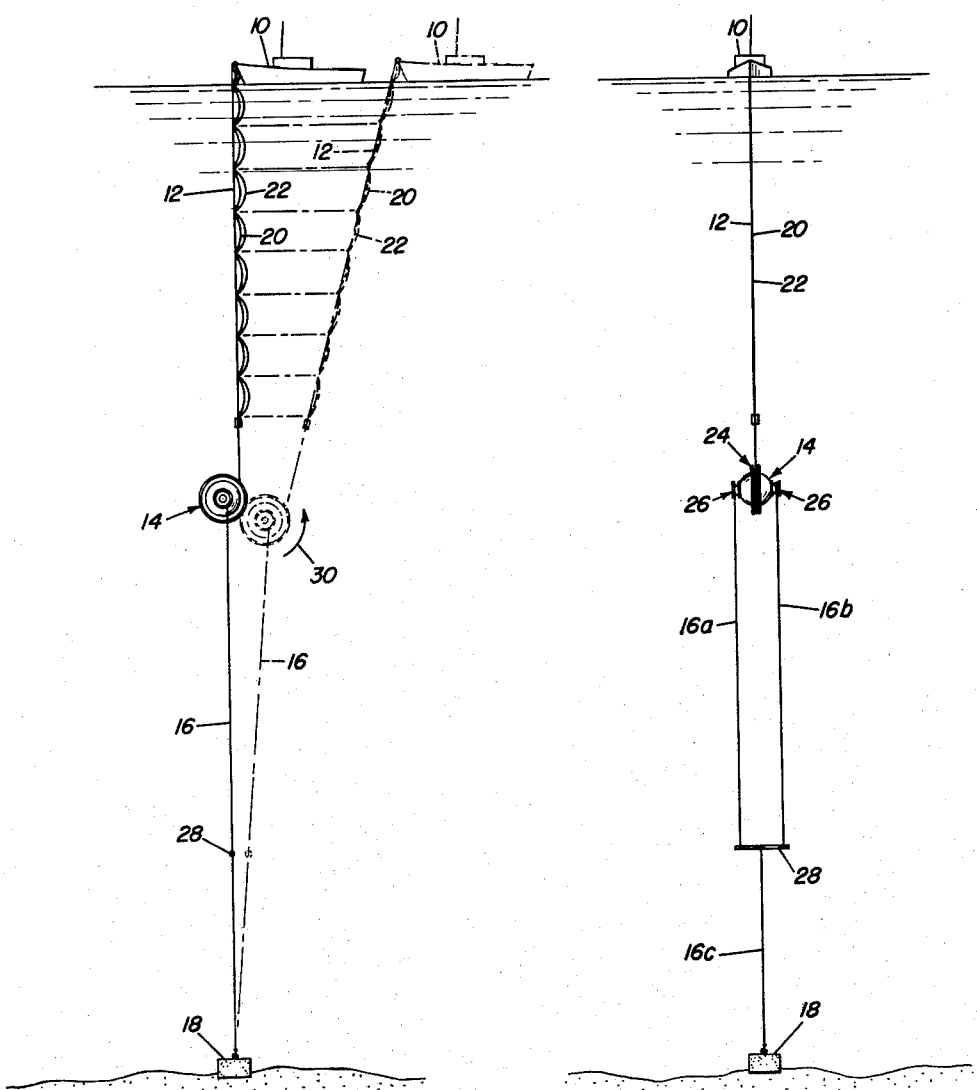

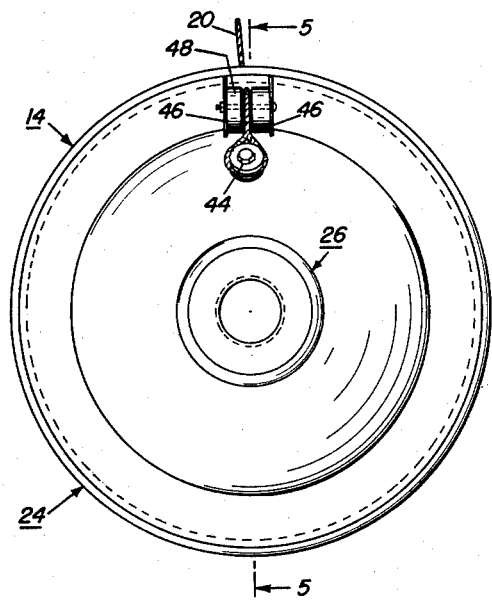
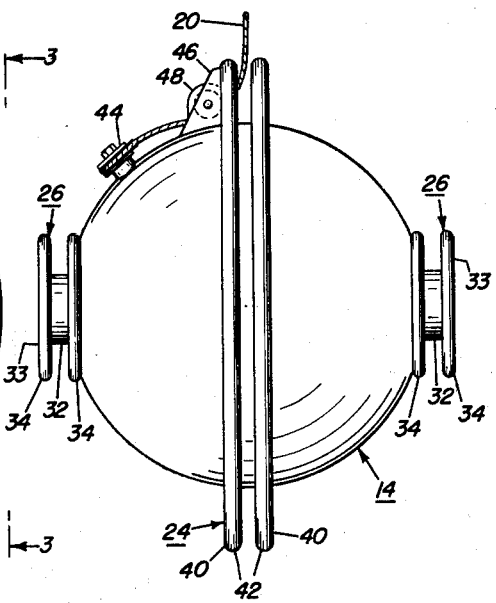
Fig. 4    Fig. 3
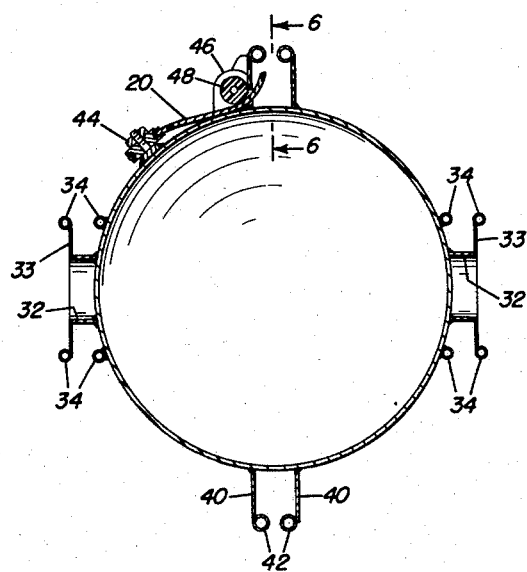
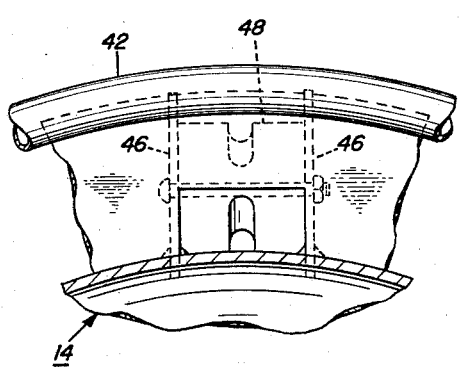
Fig. 5    Fig. 6
INVENTORS
GEORGE B. SCHICK
JOHN D. ISAACS
CECIL D. JENNINGS
ATTORNEYS

3,093,848
SELF-REELING SUB-SURFACE FLOAT
George Bernard Schick, 626 2nd St., Del Mar, Calif.; John D. Isaacs, La Orilla and El Puente, Rancho, Calif.; and Cecil D. Jennings, 2220 Cambridge, Cardiff, Calif.
Filed Aug. 18, 1961, Ser. No. 132,469
8 Claims. (Cl. 9—8)

This invention relates to apparatus for maintaining a floating or submerged body in a relatively fixed geographical position in a body of water. The subject matter of the present invention, together with other necessary components, is commonly known as a mooring system.

The present invention contemplates the use of a sub-surface float having a primary reel and one or more secondary reels. The secondary reel or reels carry a cable or cables and the free end or ends thereof are attached to an anchor at the bottom of the ocean or lake. A line or cable also wound about the primary reel and the free end thereof is connected with a surface floating body hereinafter referred to generically as a "boat."

The sub-surface float can be in the form of a cylinder but is preferably in the form of a sphere. The primary reel is disposed about the equator the sphere and the two secondary reels are disposed at the opposite poles of the sphere.

Also in the preferred embodiment the two mooring cables of the secondary reels are joined below the sub-surface float by a third cable, the latter being attached to the anchor.

This reel is used as part of a mooring system for suspending instruments at substantially constant depths in the ocean, regardless of currents, boat drift, and the like, and is used for maintaining the mooring lines and surface line taut at all times.

The advantages will be apparent from the following description, reference being had to the accompanying drawings wherein a preferred embodiment of the invention is illustrated.

In the drawings:

FIG. 1 is a diagrammatic view showing an application of the present invention;

FIG. 2 is a view similar to FIG. 1 but at right angles thereto;

FIGS. 3 and 4 show front and side views, respectively, of the sub-surface float;

FIG. 5 is a cross sectional view of the float; and

FIG. 6 is a fragmentary view showing an exemplar method of fastening a line to the sub-surface float.

Broadly stated, our invention comprises a sub-surface float that is moored to a specific point of the ocean or lake's bottoms. The buoyancy of the sub-surface float tends to keep it directly above the mooring point.

The invention also contemplates lines connecting the sub-surface float with a surface boat; these lines comprise among them, an instrument cable that transmits the data from the instruments distributed at different depths to recording devices aboard the boat.

The sub-surface float is so designed that it automatically provides a taut line between the sub-surface float, the anchor and the boat.

In FIG. 1, a boat 10, containing the recording apparatus, may be manned or unmanned; and it usually does not have engines or equipment that will permit it to remain at the same spot despite winds, etc. It is a desideratum that with the use of our invention, an unmanned boat may operate for an indefinite time.

Boat 10 is moored in the following manner: A shock cord 12, has one end attached to boat 10, and has the other end thereof attached to the sub-surface float 14. The float, in turn, is attached by a mooring cable 16 to a weight or anchor 18.

Assume that the temperature of the water is to be measured in steps to a given depth. The shock cord 12 is formed of an extensible material, such as rubber, and can stretch appreciably.

A surface line 20, of a material such as nylon, is somewhat longer that the shock cord, and is attached progressively to the shock cord so that it forms loops, as shown in FIG. 1.

An instrument line 22 is somewhat longer than the surface line, and also is attached progressively so that it forms somewhat larger loops. The instrument line, of course, comprises wires that are connected to the various instruments that are suspended in the water. A mooring cable 16 attaches it to the anchor 18.

The result of minor boat drift is shown by the dotted line representation of FIG. 1. Here boat 10 has drifted because of various conditions. Slack cord 12 has stretched to a length of surface line 20. As a result, surface line 20 has only very slight loops.

The instrument line, being slightly longer than the surface line, has slightly larger loops. It should be noted that each instrument is still at substantially its original depth, as shown by the broken lines.

If the boat drifts somewhat farther, the sub-surface float 14 starts its operation. As will be seen from FIG. 2, the sub-surface float 14, in one embodiment, is in the form of a sphere having a primary reel 24 positioned amidships, and two secondary reels 26 positioned at the ends, or "poles" the sub-surface float 14. In this way the float has an axis of rotation that is common to all the reels.

In order to maintain this axis of rotation in a horizontal orientation, two mooring cables 16a and 16b are used, and a spreader bar 28 maintains the spacing between them. A single mooring cable 16c connects the spreader bar 28 to the anchor 18.

The invention operates as follows: When boat 10 drifts even farther, the shock cord 12 stretches until surface line 20 assumes the strain. Further boat drift causes surface line 20 to rotate sub-surface float 14 in a counterclockwise direction as shown by arrow 30. This rotation causes the secondary reels to "climb down" the mooring lines 16; so that sub-surface float 14 is somewhat lower than it was previously.

The buoyancy of sub-surface float tends to keep it directly above anchor 18, but the drift of the boat pulls the float slightly to one side.

If the primary reel had a diameter of say, thirty-five feet, and the boat drift was such as to require about one hundred feet of surface line, the sub-surface float would have to make one rotation in order to provide the necessary length of line. If now the secondary reels were say six inches in diameter, one rotation of the sub-surface float would cause it to climb down the mooring lines a distance of about eighteen inches.

It will be seen that the invention effectively produces a taut line, regardless of boat drift; and keeps the instruments at their desired depth.

The invention keeps sub-surface float 14 in substantial equilibrium at all times. The reason for this will be understood from the following discussion. The buoyancy of the boat, acting through a lever arm equal to the radius of the primary reel, produces a given counterclockwise torque. In a similar manner, the buoyancy of the float, acting through a lever arm equal to the radius of the secondary reel, causes anchor 18 to produce a given clockwise torque. These two torques are substantially equal, so that the float is in substantial equilibrium.

When the drift-causing forces are reduced, the float urges boat 10 back to its original position. In this way, the arrangement acts as a substantially taut-line mooring.

The details of the sub-surface float can be understood from FIG. 3. The axles 32 of the secondary floats 26 can be formed by welding lengths of pipe to the poles of the float.

In order to form the sides of the secondary reels, a flat disk 33, or an annulus of flat plate, can be welded to the periphery of the outer ends of axles 32. We have found it desirable to weld a circle 34 of small pipe or similar structures to the circumferential periphery of disk or annulus 33, in order to form a reel rim that guides and holds the mooring cable. If desired, a similar circle 34 of pipe can be welded to the surface of the float.

The structure, which is shown in cross section in FIG. 5, provides a secondary reel of the proper diameter, having smooth edges and surfaces that guide, position, and store the mooring lines in a satisfactory manner. Of course, the above structure is exemplar only; others may alternatively be used.

The primary reel 24 can be formed in a similar manner. Annuluses 40 are welded to the equator portion of the sub-surface float to form the sides of the primary reel; and circles 42 of pipe may be attached to the circumferential periphery of annuluses 40, to form smooth strong reel edges.

We have found that the mooring cables 16 may be steel cables of relatively small diameter. Since the primary reels 26 store feed relatively short lengths of mooring cables, we have found it satisfactory to fasten the ends of the mooring cables directly to the axle 32 in any suitable manner.

We have also found that nylon is a good material for the surface line 20. The nylon surface line is of a relatively large diameter, and sufficient is stored thereon. To insure smooth reeling and layering of the nylon line, we have found it advisable to "anchor" the nylon line outside of the primary reel. One apparatus for doing this is shown in FIGS. 3, 4, 5, and 6. Basically a hole is made through one annulus 40 of the primary reel, and the end of nylon line is fed through this hole and fastened to a line-anchoring device 44. One easy way to achieve this result is to form a loop or a thimble on the end of the nylon line, and to fasten this thimble to line-anchoring device in any suitable manner.

In order to strengthen the annulus 40 at the point that it is traversed by the nylon line, we use two triangular gussets 46, and a cylindrical line guide 48. In this way the nylon line is guided smoothly out of the primary reel, gently curved and guided, and fastened to a line-anchor. This permits a secure fastening, and smooth even layers of line in the reel.

It is frequently necessary to position instruments in water of the ocean to measure certain of its characteristics. One of the most often measured characteristics is the lake or ocean water temperature; particularly the way the temperatures at different depths vary in relation to each other with respect to time.

To obtain this information, instruments such as electrical thermometers are fastened at spaced intervals to a line; one end of which is then dropped overboard from a boat. Recording instruments in the boat make permanent records that are later interpreted.

To assure that the measurements are always taken at the same location, a weight or anchor is attached to the lower end of the line. This weight drops to the bottom, and fixedly positions the lower end of the line. However, the upper end of the line, being fastened to the boat, unless prevented, would shift its position as the boat moves under the influence of wind, currents, waves, etc.

At times the instruments have to be checked or replaced. This is readily accomplished in the following manner: If the instrument line has a length of say one thousand feet, an extra one thousand foot length of surface line is stored on the primary reel 24. When the instruments are to be checked or removed the instrument line and surface lines are pulled aboard the boat. Since the surface line has an extra one thousand foot length, the primary reel pays this out, so that the instrument line can be brought aboard. During this operation, the secondary reels store an additional length of mooring line as the float rotates; since each rotation adds a small length of mooring line, the float climbs down the mooring line in the manner previously explained. In this manner, the instrument may be checked, replaced, repaired or salvaged.

Thus it will be seen from the foregoing that apparatus has been provided for suspending a taut instrument line below the surface of the water which allows this instrument line to be retrieved, replaced and reinstalled automatically without disturbing the lower part of the anchor.

While the form of embodiment herein shown and described constitutes a preferred form, it is to be understood that other forms may be adopted falling within the scope of the claims that follow.

We claim:

1. Apparatus for suspending an instrument at a substantially constant depth in water, comprising in combination:
    (A) a surface floating element;
    (B) a buoyant body;
    (C) means for attaching the buoyant body, while submerged, to said surface floating element and for maintaining the buoyant body submerged at a substantially constant depth including:
        (1) an anchor;
        (2) a mooring line having one end connected with the anchor;
        (3) said buoyant body including a primary reel and a mooring reel, said reels having a common axis, the diameter of the primary reel being greater than the diameter of the mooring reel;
        (4) a surface line having one end thereof fastened to the surface floating element,
            (a) the surface line being coiled in one direction about the primary reel and the end opposite the first mentioned end thereof being fastened to said primary reel,
            (b) the mooring line being coiled in the opposite direction about the mooring reel and the end opposite the first mentioned end thereof being fastened to said mooring reel.

2. An apparatus as defined in claim 1, characterized to include:
        (5) a duplicate mooring reel and mooring line thereon, the duplicate mooring reel having a common axis with the primary reel, and the mooring line thereon being coiled in said opposite direction,
            (c) said axis lying in a substantially horizontal plane,
            (d) and said primary reel being disposed between said mooring reels.

3. An apparatus as defined in claim 2, in which the buoyant body is substantially spherically shaped, the primary reel being located at the equator thereof, and the mooring reels being located at the poles thereof.

4. Apparatus for suspending an instrument at a substantially constant depth in water, comprising in combination:
    (A) a surface floating element;
    (B) a submerged buoyant body having a primary reel and a mooring reel, said reels having a common axis;
    (C) a surface line coiled in one direction about the primary reel and having one end fastened to the primary reel, the other end of said line being fastened to said surface floating element;
    (D) an anchor;
    (E) a mooring line coiled in the opposite direction about the mooring reel and having one end fastened to the mooring reel, the other end of the mooring line being fastened to said anchor,
(1) the diameter of the primary reel being greater than the diameter of the mooring reel.
5. Apparatus as defined in claim 4, characterized to include:
(2) a duplicate mooring reel and mooring line thereon, the duplicate mooring reel having a common axis with the primary reel, and the mooring line thereon being coiled in said opposite direction,
(a) said axis lying in a substantially horizontal plane,
(b) and said primary reel being disposed between said mooring reels.
6. An apparatus as defined in claim 5, in which the buoyant body is substantially spherically shaped, the primary reel being located at the equator thereof, and the mooring reels being located at the poles thereof.
7. Apparatus for suspending instruments at substantially constant depths in water, comprising in combination: A surface floating element; a buoyant spherical body having a primary reel and secondary reels on opposite sides of said primary reel, all said reels having a common axis of rotation; an anchor; a pair of mooring cables, each cable having one end effectively attached to said anchor, and coiled in a given direction around respective ones of said secondary reels; a surface line coiled in the opposite direction around said primary reel, the free end of said surface line being attached to said surface floating element; and an instrument cable attached in loop fashion to said surface line.

8. Apparatus for suspending instruments at substantially constant depths in water, comprising in combination: A surface floating element; a subsurface float comprising a buoyant spherical body having a primary reel and secondary reels on opposite sides of said primary reel, all said reels having a common axis of rotation; an anchor; a spreader bar; a primary mooring cable having one end attached to said anchor and its other end attached to said spreader bar; a pair of secondary mooring lines attached to and coiled in a given direction, respectively, around said secondary reels, the other ends of said secondary mooring lines attached to said spreader bar; a surface line coiled in the opposite direction around said primary reel, the free end of said surface line being attached to said surface floating element; an instrument cable attached in loop fashion to said surface line; and an extensible shock cord attached between said surface floating element and the bottom of said instrument cable.

References Cited in the file of this patent

UNITED STATES PATENTS

| | | |
|---|---|---|
| 52,522 | Bowlsby | Feb. 13, 1866 |
| 2,903,716 | Zasada | Sept. 15, 1959 |
| 3,005,215 | Colt et al. | Oct. 24, 1961 |

FOREIGN PATENTS

| | | |
|---|---|---|
| 362,324 | Great Britain | Dec. 3, 1931 |